US008392781B2

(12) United States Patent
Batra et al.

(10) Patent No.: US 8,392,781 B2
(45) Date of Patent: Mar. 5, 2013

(54) HYBRID-ARQ (HARQ) WITH SCRAMBLER

(75) Inventors: Anuj Batra, Dallas, TX (US); Deric W. Waters, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 517 days.

(21) Appl. No.: 12/686,929

(22) Filed: Jan. 13, 2010

(65) Prior Publication Data

US 2010/0180173 A1 Jul. 15, 2010

Related U.S. Application Data

(60) Provisional application No. 61/144,316, filed on Jan. 13, 2009, provisional application No. 61/145,391, filed on Jan. 16, 2009.

(51) Int. Cl.
*G08C 25/02* (2006.01)
*H03M 13/00* (2006.01)

(52) U.S. Cl. ........................................ 714/748; 714/751

(58) Field of Classification Search ........................ None
See application file for complete search history.

(56) References Cited

U.S. PATENT DOCUMENTS

| | | | |
|---|---|---|---|
| 5,983,382 A | 11/1999 | Pauls | |
| 6,662,332 B1 * | 12/2003 | Kimmitt | 714/762 |
| 7,447,967 B2 * | 11/2008 | Onggosanusi et al. | 714/748 |
| 7,526,038 B2 | 4/2009 | McNamara | |
| 7,599,332 B2 * | 10/2009 | Zelst et al. | 370/334 |
| 7,936,806 B2 * | 5/2011 | Yu et al. | 375/135 |
| 8,000,223 B2 * | 8/2011 | Moorti et al. | 370/208 |
| 8,300,533 B2 * | 10/2012 | Malladi et al. | 370/235 |
| 2004/0203456 A1 * | 10/2004 | Onggosanusi et al. | 455/67.13 |
| 2005/0215251 A1 * | 9/2005 | Krishnan et al. | 455/434 |
| 2005/0286474 A1 * | 12/2005 | van Zelst et al. | 370/334 |
| 2007/0150787 A1 * | 6/2007 | Kim et al. | 714/748 |
| 2007/0258373 A1 * | 11/2007 | Frederiksen et al. | 370/235 |
| 2007/0293172 A1 * | 12/2007 | Shi et al. | 455/187.1 |
| 2008/0075184 A1 * | 3/2008 | Muharemovic et al. | 375/260 |
| 2008/0101440 A1 * | 5/2008 | Lee | 375/141 |
| 2009/0031185 A1 * | 1/2009 | Xhafa et al. | 714/751 |
| 2010/0054211 A1 * | 3/2010 | Gaal | 370/335 |
| 2010/0142364 A1 * | 6/2010 | Sahlman | 370/210 |

OTHER PUBLICATIONS

Tao Shi; Lei Cao; , "Combining techniques and segment selective repeat on turbo coded hybrid ARQ," Wireless Communications and Networking Conference, 2004. WCNC. 2004 IEEE , vol. 4, No., pp. 2115- 2119 vol. 4, Mar. 21-25, 2004.*

* cited by examiner

*Primary Examiner* — Cynthia Britt
*Assistant Examiner* — Daniel McMahon
(74) *Attorney, Agent, or Firm* — Steven A. Shaw; W. James Brady; Frederick J. Telecky, Jr.

(57) ABSTRACT

Embodiments of the invention provide a system and method of hybrid automatic repeat-request (HARQ) processing. A viterbi decoder is coupled to and follows a descrambler. After the signal has been de-scrambled, it can be stored in a memory in case it needs to be recombined with another packet. This means that the log-likelihood ratios LLRs for each transmitted bit are stored in memory using a finite number of bits (for example, between 4 and 12 bits). If the packet that is currently being processed contains retransmitted information, then the de-scrambled output stored from a previous packet containing the same information can be loaded and combined with the current packet.

7 Claims, 5 Drawing Sheets

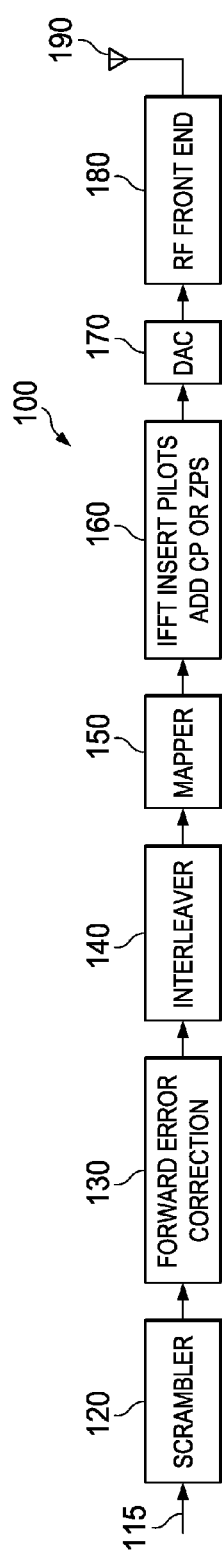
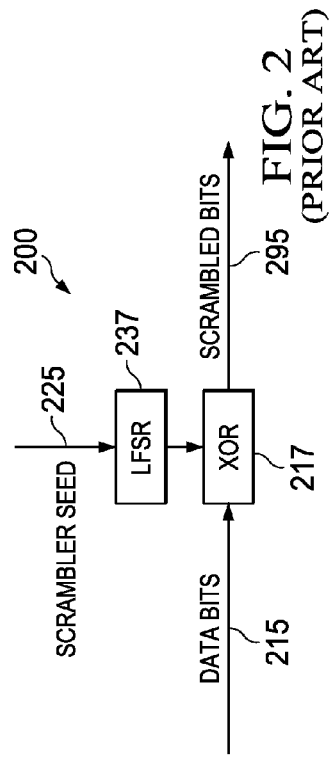
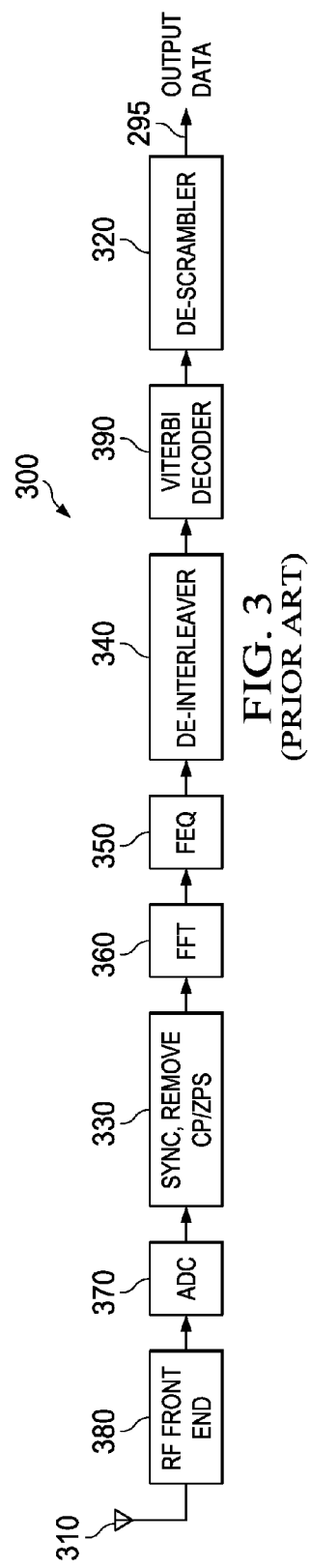

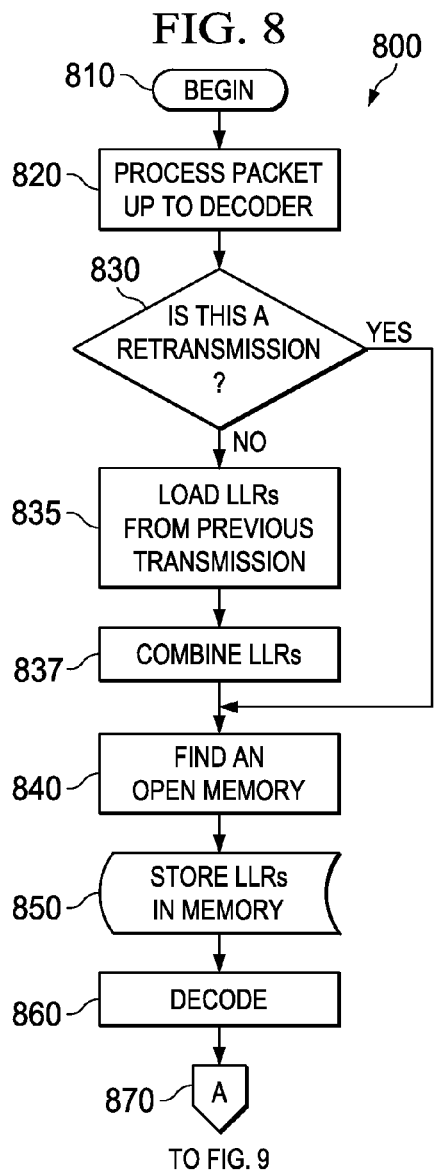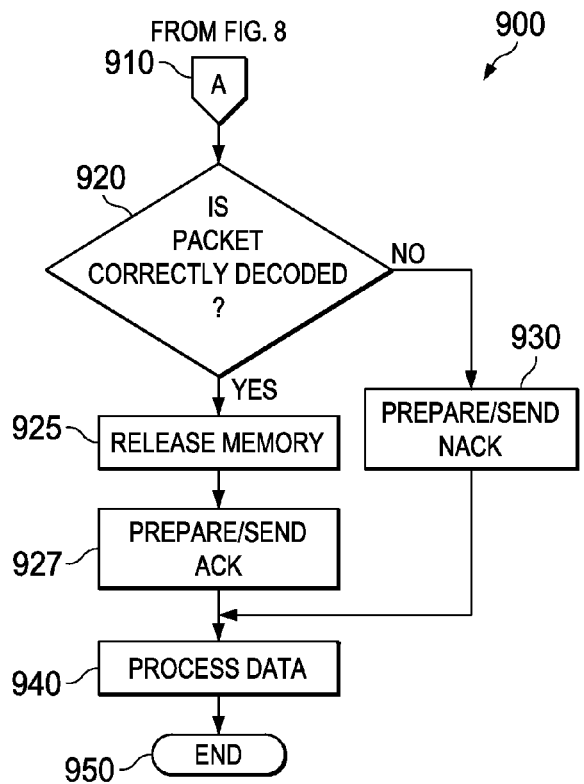
FIG. 8
FIG. 9

HYBRID-ARQ (HARQ) WITH SCRAMBLER

CROSS-REFERENCE TO RELATED APPLICATIONS

This Application claims priority, under 35 U.S.C. §119(e), to Provisional Application No. 61/144,316, filed on Jan. 13, 2009 and 61/145,391, filed on Jan. 16, 2009. Said applications incorporated herein by reference.

BACKGROUND

Embodiments of the invention are directed, in general, to communication systems and, more specifically, a hybrid-ARQ (HARQ) with a scrambler.

In a wireless communication system, it is impossible for a device to decode all of the packets correctly. The packet may fail because of, inter alia:

A low signal-to-noise ratio (SNR)

Interference

Clipping at the transmitter due to peak-to-average ratio (PAR)

One common method that is used to assure that all packets are delivered correctly is called automatic-repeat request (ARQ). In this method, the receiving device sends either an acknowledgement (ACK) or a negative-acknowledgement (NACK) to the transmitting device regarding the decode-status of the packets. If the transmitting device receives a NACK or times out waiting for the ACK/NACK, it will then retransmit that packet. This process continues until the receiving device successfully decodes the packet or opportunity to transmit the packet expires, which is also called a time-out.

A further improvement upon the ARQ scheme is called hybrid-ARQ (HARQ). In this method, the receiving device will combine the soft information from (for example Chase combining or any other well-known method for combining soft information such as LLRs) a retransmission with the original transmission to increase the probability of correctly decoding the packet. This performance improvement comes at the cost of a slight increase in complexity at the receiver.

BRIEF DESCRIPTION OF THE DRAWINGS

Figure 4:
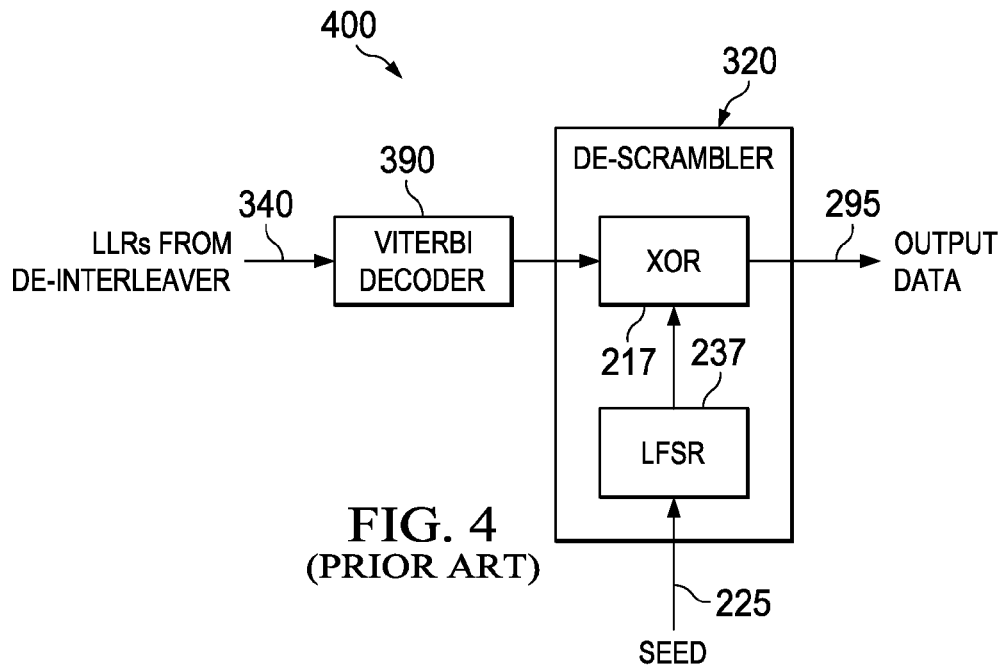
Figure 5:
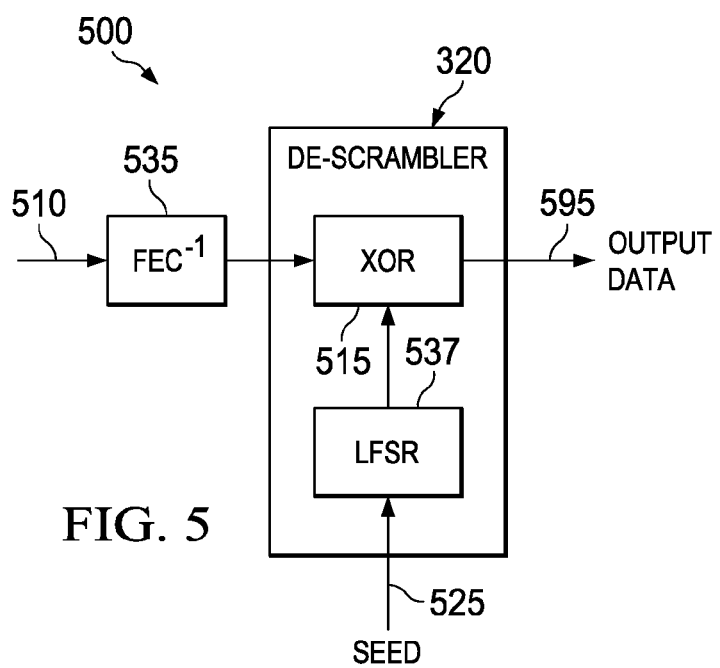
Figure 6:
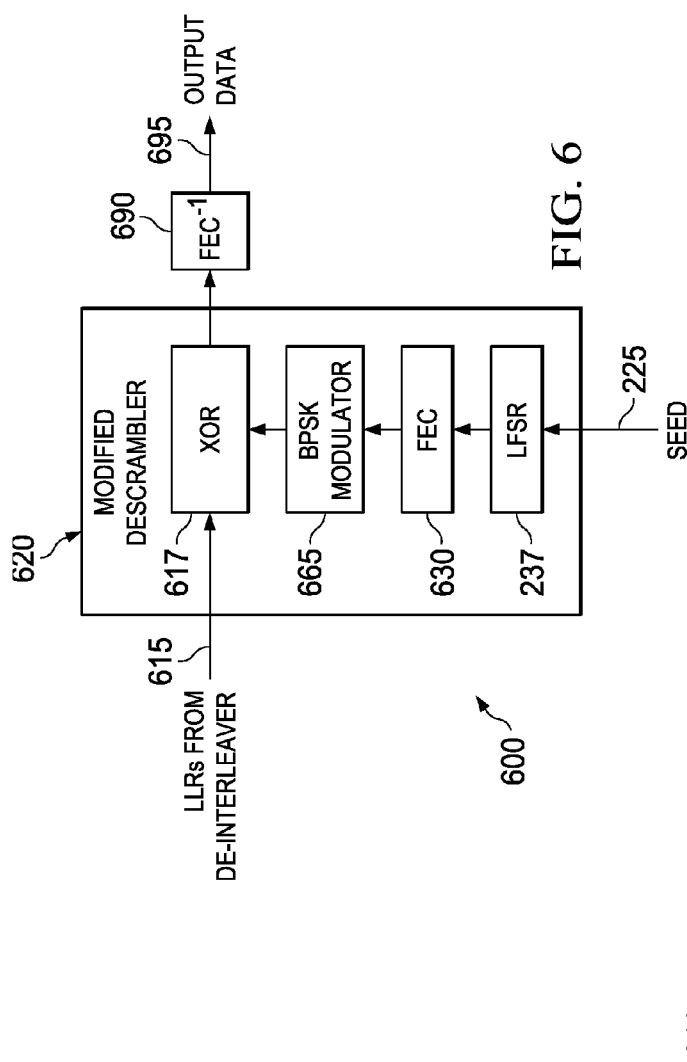
Figure 7:
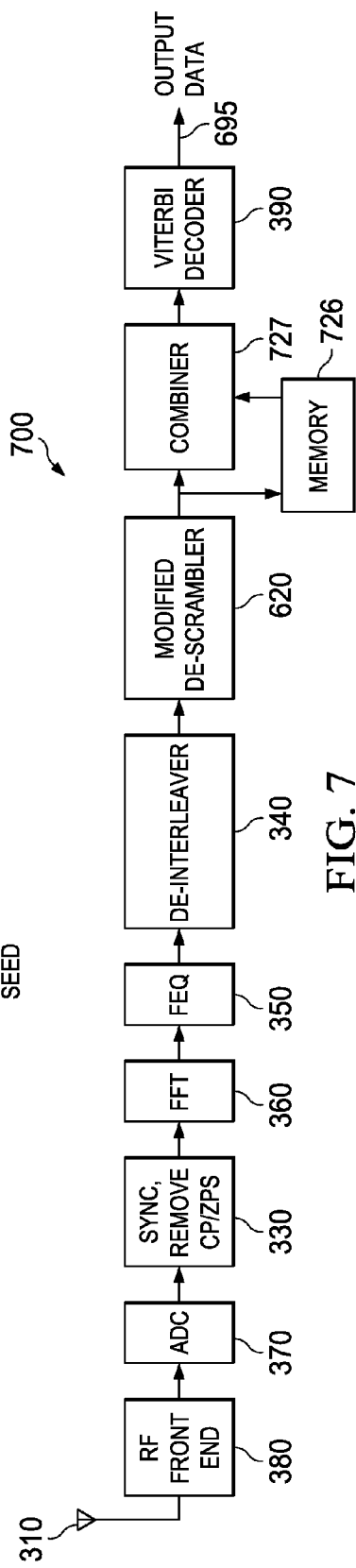

Having thus described the invention in general terms, reference will now be made to the accompanying drawings, which are not necessarily drawn to scale, and wherein:

FIG. 1 is a block diagram illustrative of a transmitter;

FIG. 2 shows scrambling operation;

FIG. 3 is a block diagram illustrative of a receiver;

FIG. 4 is a further block diagram illustrative of a receiver;

FIG. 5 shows changing order of linear operations in the receiver;

FIG. 6 shows changing order of linear operations in the receiver in accordance with embodiments of the invention;

FIG. 7 is a block diagram illustrative of a transmitter of receiver for HARQ;

FIG. 8 is a flow diagram illustrative of receiver PHY layer processing; and

FIG. 9 is a flow diagram illustrative of receiver higher layer processing.

Figure 10:
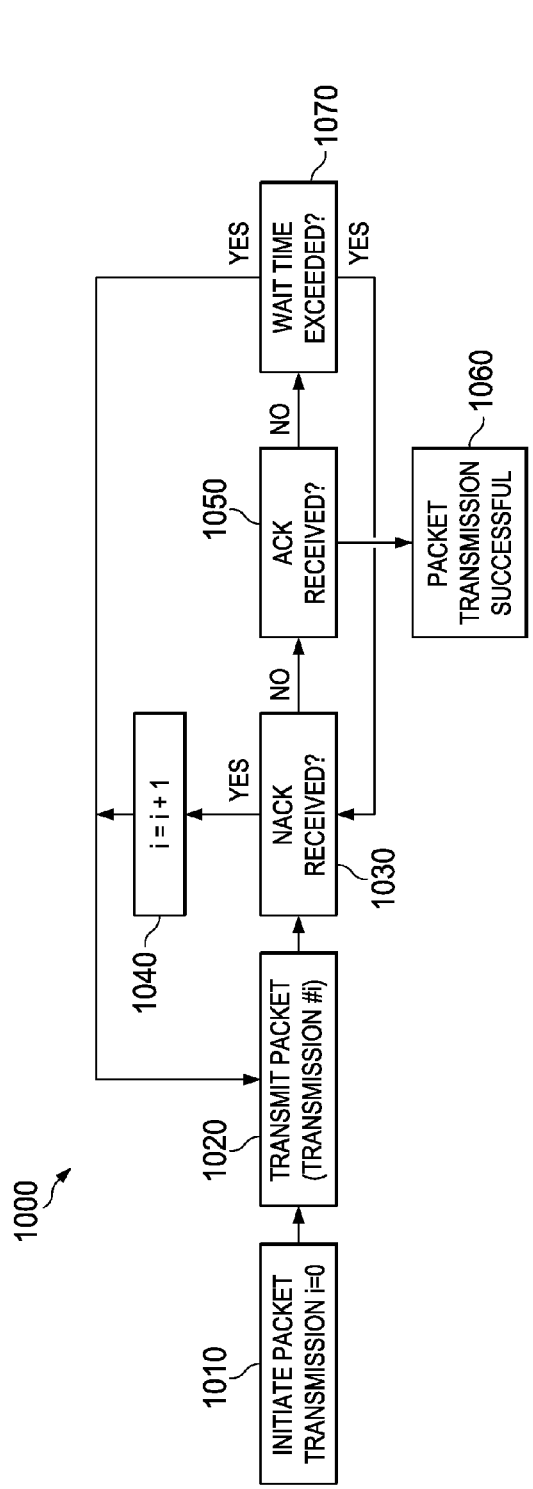

FIG. 10 is a flow diagram illustrative of processing at transmitter.

Figure 11:
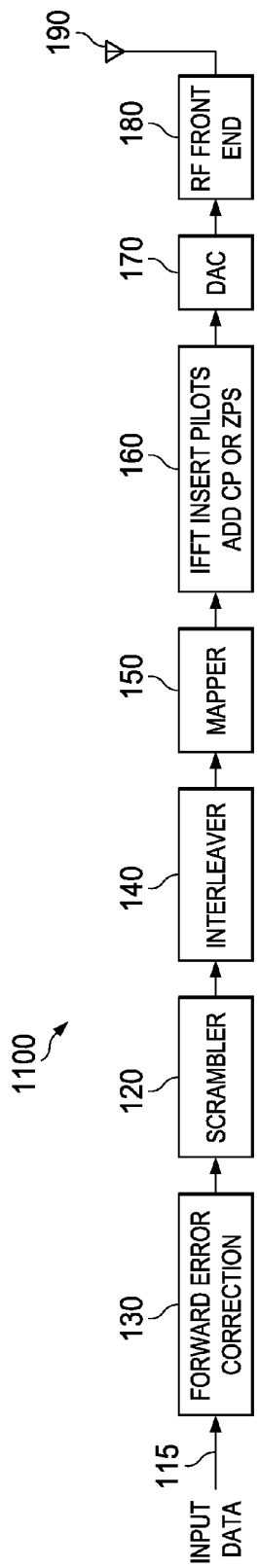

FIG. 11 is a block diagram illustrative of a modified transmitter.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In most wireless systems, it is important or at least advantageous to transmit data that is spectrally flat (or spectrally white). One common way of whitening the data is to use a scrambler. FIG. 1 shows a block diagram of a wireless device 100 that includes a scrambler. The device 100 comprising scrambler 120 receiving data 115, forward error correction (FEC) 130, interleaver 140, mapper 150, inverse fast fourier transform (IFFT) for inserting pilots, adding cyclic prefix, a zero-padded prefix, or a zero-padded suffix 160. The device 100 also comprising digital analog convertor DAC 170 and radio frequency (RF) front end 180 coupled to antenna 190. Antenna is shown as an exemplar, data can be inputted into system by a wired connection also. This block diagram could represent either the transmitter for a wireless LAN device, or a MultiBand-OFDM (WiMedia/ECMA-368) device, or a Cognitive Networking Alliance (CogNeA/ECMA-392) device. In each of these systems, and many others, the scrambler is implemented using a linear feedback shift register (LFSR).

Referring now to FIG. 2, which is illustrative of a scrambling operation 200. For a given seed 225, the LFSR 237 generates a pseudo-random sequence that is used by exclusive or (XOR) 217 to scramble the data 215. Other scrambler implementations are also possible. This scrambler shown in FIG. 2 is a side-stream scrambler. The scrambler may also be implemented as a self-synchronizing scrambler. For a side-stream scrambler, an initialization seed may need to be specified and seed communicated in the PHY header. A linear feedback shift register may be used to implement a self-stream scramble and an unique ID may be used in conjunction to the seed. A self-synchronizing scrambler does not need an initialization seed and randomness is a function of input data.

Scrambling may help overcome packet errors that occur due to clipping at the transmitter caused by PAR. If the retransmitted packet uses a different scrambling seed then the values transmitted on the frequency tones will differ from the original packet and the PAR will be completely different. Retransmissions should scramble the data differently. Unfortunately, scrambling may complicate the receiver processing, especially when trying to implement a hybrid-ARQ scheme.

FIG. 3 is illustrative of a receiver 300 which is built to work with the transmitter illustrated in FIG. 1. The receiver 300 comprising antenna 310, radio frequency (RF) front end 380 coupled to antenna 310 (a wired connection is also in scope of embodiments of the invention), analog to digital convertor (ADC) 370, de-scrambler 320, deinterleaver 340, synchronization and removal of cyclic prefix or overlap-and-add to account for a zero padding prefix or suffix 330, fast fourier transform (FFT) 360, Frequency. Equalization (FEQ) 350. The receiving processing mainly just reverses the processing performed at the transmitter. See device 100 in FIG. 1. Consider the data at the input to the Viterbi decoder 390 because this is the point where the signals from multiple transmissions would be combined in an HARQ scheme to improve performance. Because the de-scrambling operation in de-scrambler 320 follows the Viterbi decoder 390, the input to the Viterbi decoder depends on the seed used in the scrambler at the transmitter. This prevents combining multiple transmissions before the Viterbi decoder 390.

FIG. 4 provides a more detailed look at the de-scrambler 320 receiving the log-likelihood ratios (LLRs) from the de-interleaver 340. The receiver needs to have knowledge of scrambling seed 225 (which is usually transmitted in the header or can be derived from other known information) which was used by the transmitter for scrambling. The receiver uses the seed 225 to initialize the LFSR 237 and generate the de-scrambling sequence. Since the scrambling sequence is binary, the de-scrambling sequence is in effect the same as the scrambling sequence. Therefore, the de-scrambling operation is implemented by applying the scrambling sequence to the output of the Viterbi decoder 390, which effectively implies that the scrambling sequence is applied for a second time which returns the signal to its original value before scrambling.

Mathematically, if d is the data signal before scrambling and s is the value used to scramble the signal then the signal at the input to the FEC at the transmitter is:

$$f = d \oplus s.$$

At the receiver, ideally the input to the de-scrambler is f. The de-scrambler recreates the scrambling sequence s and applies it to the signal again to produce the output of the de-scrambler g:

$$g = f \oplus s = d \oplus s \oplus s = d.$$

To enable HARQ combining at the receiver, FIG. 5 is illustrative of an embodiment of the invention which switches the order of the de-scrambler 320 and the Viterbi decoder 390. The key observation here is that if the scrambler 120 (de-scrambler 320) and FEC 130 encoder (FEC decoder 390) are linear operations, then it is possible to swap their order without changing the result. A scrambler that is implemented using an LFSR 237 is a linear operation. An FEC encoder 130 and equivalently an FEC/Viterbi decoder 390 that is implemented using a linear code will also be a linear operation. In FIG. 6, the FEC/Viterbi decoder is represented by $FEC^{-1}$ to emphasize that it inverts the FEC. Non-exhaustive examples of linear codes are:

convolutional codes,
Reed-Solomon codes,
Low-density parity check (LDPC) codes,
Two concatenated linear codes (Reed-Solomon/convolutional for example)

FIG. 6 is a block diagram of modified descrambler for changing order of linear operations in the receiver in accordance with embodiments of the invention. FIG. 6 is illustrative of the transformation required in the receiver to allow the order of the de-scrambler 620 and the Viterbi decoder to be swapped. In FIG. 6, the Viterbi decoder is represented by $FEC^{-1}$ 690 to emphasize that it inverts the FEC. Although the decoder is not limited to a Viterbi decoder. The signal used for de-scrambling must also be modified by passing it through the FEC 630. This can be understood from basic algebra:

$$O = (FEC^{-1} * d) \oplus s = FEC^{-1} * (d \times BPSK[FEC * s]),$$

where FEC*s represents the encoding of the data s, $FEC^{-1}$*d represents the decoding of the signal d, BPSK[.] represents BPSK modulation of a binary sequence, d represents the log likelihood ratio (LLR) inputs 345 to the Viterbi decoder, and s represents the scrambling sequence. Note that the input LLRs are real numbers, while the output of the $FEC^{-1}$ is a binary sequence. So when moving the de-scrambler to the other side of the $FEC^{-1}$, it is important that the sequence used for de-scrambling also be a real number. This is achieved by passing the encoded scrambler sequence (FEC*s) through a BPSK modulator 665 to generate a real sequence {−1, +1}.

Finally, a receiver block diagram in accordance with embodiments of the invention is illustrated in FIG. 7. The receiver in accordance with embodiments of the invention 700 comprising antenna 310 (a wired connection is also in scope of embodiments of the invention), radio frequency (RF) front end 380 coupled to antenna 310, analog to digital convertor (ADC) 370, synchronizer to remove cyclic prefix and for zero padding 330, fast fourier transform (FFT) 360, frequency equalization (FEQ) 350, deinterleaver 340. Receiver 700 also comprising a descrambler in accordance with embodiments of the invention 620, coupled to memory 726 and combiner for combining transmissions 727. A Viterbi decoder 390 is coupled to and follows the descrambler 620.

After the signal has been de-scrambled, it can be stored in memory 726 in case it needs to be recombined with another packet. This means that the log-likelihood ratios LLRs for each transmitted bit are stored in memory 726 using a finite number of bits (for example, between 4 and 12 bits). If the packet that is currently being processed contains retransmitted information, then the de-scrambled output stored from a previous packet containing the same information can be loaded and combined 727 with the current packet.

Diversity in HARQ

The performance improvement that comes from conventional HARQ can be understood by looking at the received signal on a single frequency tone:

$$r_i = h_i \cdot a + n_i,$$

where the subscript i indicates these values are from the i-th transmission of the packet, $r_i$ is the value of one frequency tone at the receiver after the FFT, a is the modulation symbol sent by the transmitter (from a PSK or QAM constellation for example), $h_i$ is the gain of the channel, and $n_i$ is additive noise. Assume that the modulation symbol a is the same for all transmissions, which is generally not true, but this assumption is made to illustrate the gain of HARQ. The receiver may implement equalization by dividing out the channel gain:

$$y_i = \frac{r_i}{h_i} = a + \frac{n_i}{h_i}.$$

The probability of getting an error is driven by the magnitude of this noise, $|n_i/h_i|$. For example, if BPSK modulation is used so that $a \in \{\pm 1\}$, then $y_i$ is the LLR. During two successive transmissions of a packet the receiver computes two different LLRs:

$$y_1 = a + \frac{n_1}{h_1},$$

$$y_2 = a + \frac{n_2}{h_2}.$$

In many wireless mediums, the channel gain on frequency tones will be highly correlated from one transmission to another. However, in existing HARQ schemes the same data is retransmitted on the same frequency tone and so there is a high correlation between the channel gains ($h_1$ and $h_2$). So if the channel gain is small in the first transmission, it is likely to also be small in the second transmission. In this case the improvement due to HARQ is limited to the 3 dB improvement.

The improvement to HARQ illustrated by the embodiments of the invention is to change the frequency tone mapping used in successive retransmissions. If the extreme case is considered where $h_1=0$, then the both transmissions are very likely to fail for that tone. On the other hand, if different frequency tones are used in successive transmissions then it is more likely that all symbols will have a favorable channel gain during at least one of the transmissions. This leads to diversity in the system and increases the probability of successfully decoding the packet after a retransmission.

In many wireless mediums, the correlation between channel gains on frequency tones decreases with increasing distance between the frequencies. Therefore, to minimize the probability that a given symbol sees a poor channel gain across retransmissions the tones used for a given symbol should be as far away in frequency as possible. A cyclic shift of half the number of tones would be best in this context.

To understand the proposed improvement to the HARQ system, the transmitted signal needs to be defined. A packet contains M OFDM symbols, and each packet could be retransmitted up to R times. Each OFDM symbol includes guard, pilot, and data tones. Generally, each packet begins with a preamble, followed by a header, followed by the payload. The preamble, header and payload could each be multiple OFDM symbols in duration. The proposed enhancements are mainly focused on the header and payload portions because that is where the data is contained.

The m-th OFDM symbol of the transmitted signal after the mapper 150 and before the IFFT 160 in FIG. 1 during the i-th transmission of the packet can be written mathematically as:

$$r_i^{(m)}(t) = \frac{1}{\sqrt{N}} \sum_{n=-N/2, n\neq 0}^{n=N/2} s_i^{(m)}(n) \cdot \exp(j2\pi\Delta f \cdot n \cdot t)$$

where N is the total number of non-zero frequency tones, $s_i^{(m)}(n)$ is the modulated symbol, $\Delta f$ is the subcarrier spacing in Hz, the OFDM symbol index m goes from 1 to M, and the retransmission index i goes from 0 to R. The proposed frequency tone mapping method only applies to the data tones—not the guard or pilot tones. Therefore, it is convenient to rewrite the transmitted signal into data and non-data portions:

$$r_i^{(m)}(t) = \underbrace{\frac{1}{\sqrt{N}} \sum_{n \in D_i^{(m)}} s_i^{(m)}(n) \cdot \exp(j2\pi\Delta f \cdot n \cdot t)}_{Data_i^{(m)}(t)} +$$

$$\underbrace{\frac{1}{\sqrt{N}} \sum_{n \in P_i^{(m)}} s_i^{(m)}(n) \cdot \exp(j2\pi\Delta f \cdot n \cdot t)}_{Pilot_i^{(m)}(t)}$$

where the sets $D_i^{(m)}$, which represents the data tones, and $P_i^{(m)}$, which represents the pilot tones, are disjoint. Generally speaking the set of pilot tones is much smaller than the set of data tones so it is more convenient to define the set $D_i^{(m)}$ by defining $P_i^{(m)}$ and $D_i^{(m)} \cup P_i^{(m)}$.

Here is a specific example where the location of the pilot tones is the same for each OFDM symbol:

$$D_i^{(m)} \cup P_i^{(m)} = [-85:-1, 1:85],$$

$$P_i^{(m)} = [-70, -42, -14, 14, 42, 70],$$

where the A:B notation means all the integers from A to B (including A & B).

Sometimes the pilot tones are hopped across frequency, which means that the pilot tones are on different frequency tones in different OFDM symbols within a packet. A specific example is:

1st OFDM symbol:

$$D_i^{(1)} \cup P_i^{(1)} = [-85:-1, 1:85],$$

$$P_i^{(1)} = [-84, -56, -28, 4, 32, 60]$$

2nd OFDM symbol:

$$D_i^{(2)} \cup P_i^{(2)} = [-85:-1, 1:85],$$

$$P_i^{(2)} = [-64, -36, -8, 24, 52, 80]$$

3rd OFDM symbol:

$$D_i^{(3)} \cup P_i^{(3)} = [-85:-1, 1:85],$$

$$P_i^{(3)} = [-72, -44, -16, 16, 44, 72]$$

etc.

Let $D_i^{(m)}(k)$ be the k-th data tone in the set $D_i^{(m)}$, which is the set of data tones in the m-th OFDM symbol during the i-th transmission of the packet. For example, as an illustration let the set be $D_i^{(m)} = [-4, -2, 2, 4]$, then $D_i^{(m)}(0) = -4$, $D_i^{(m)}(1) = -2$, $D_i^{(m)}(2) = 2$, and $D_i^{(m)}(3) = 4$.

Finally, with this nomenclature the data portion of the transmitted signal during the m-th OFDM symbol of the i-th packet transmission in a traditional HARQ method can be written as:

$$Data_i^{(m)}(t) = \frac{1}{\sqrt{N}} \sum_{k=0}^{N_D-1} s_i^{(m)}(D_o^{(m)}(k)) \cdot \exp(j2\pi F \cdot D_0^{(m)}(k) \cdot t) \quad (1)$$

$$= \frac{1}{\sqrt{N}} \sum_{n \in D_i^{(m)}} s_i^{(m)}(n) \cdot \exp(j2\pi F \cdot n \cdot t),$$

where $N_D$ is the number of data tones.

The nomenclature has been defined in such a way that the proposed improvement can be expressed with a small change. First, a conceptual description of the improvement is in order. In order to maximize the probability of decoding the packet during a retransmission when HARQ is implemented the channel gains for individual frequency tones in the original packet and the retransmitted packet should be as uncorrelated as possible. The proposal here to minimize correlation between a retransmitted packet and the original packet is to shift the frequency tones. For example, let the data tones for a packet with a single OFDM symbol be divided into four groups of equal size: a, b, c, and d.

Original packet transmission: $D_0^{(1)} = [a, b, c, d]$
First packet retransmission: $D_1^{(1)} = [c, d, a, b]$
Second packet retransmission: $D_2^{(1)} = [b, c, d, a]$
Third packet retransmission: $D_3^{(1)} = [d, a, b, c]$
Fourth packet retransmission: $D_0^{(1)} = [a, b, c, d]$
Etc.

Note that the scheme cyclically shifts the data in the frequency-domain for each retransmission. For the first retransmission, the data is cyclically shifted in the frequency-domain by one-half of the number of data tones. For the second retransmission, the data is cyclically shifted in the frequency-domain by one-quarter of the number of data tones. For the third retransmission, the data is cyclically shifted in the frequency-domain by three-quarters of the number of data tones.

Referencing the previous example with fixed pilots, groups a, b, c, and d would consist of the following tones:

Group a=[−85:−71, −69:−44]
Group b=[−43, −41:−15, −13:−1]
Group c=[1:13, 15:41, 43]
Group d=[44:69, 71:85]

In general, the data tones could be divided into more (or less) than four groups in which case more (or less) than three retransmissions would be possible. It is trivial to figure out the groupings and cyclic shifts required for more or less retransmissions. It is even possible to have an odd-number of maximum retransmissions, by just specifying a subset of the possible cyclic shifts. For example, we could only specify $D_0^{(1)}$, $D_1^{(1)}$ and $D_2^{(1)}$ to achieve a scheme that allows an original transmission and only 2 unique retransmissions. Note that non-unique retransmissions may still be allowed, in this context this means the number of retransmissions may exceed the number of tone groups. For example, only two tone groups could be defined, where each retransmission toggles between cyclical shifts in the frequency domain by half the number of data tones.

In terms of equation (1) the proposed HARQ scheme with four groups of data tones is defined as follows:

Original packet transmission:

$$Data_i^{(m)}(t) = \frac{1}{\sqrt{N}} \sum_{k=0}^{N_D-1} s_i^{(m)}(D_i^{(m)}(k)) \cdot \exp(j2\pi F \cdot D_0^{(m)}(k) \cdot t)$$

First packet retransmission:

$$D_1^{(m)}(k) = D_0^{(m)}\left(\left(k + \frac{1}{2}N_D\right) \bmod N_D\right)$$

Second packet retransmission:

$$D_2^{(m)}(k) = D_0^{(m)}\left(\left(k + \frac{1}{4}N_D\right) \bmod N_D\right)$$

Third packet retransmission:

$$D_3^{(m)}(k) = D_0^{(m)}\left(\left(k + \frac{3}{4}N_D\right) \bmod N_D\right)$$

Since the frequency tone mapping varies during the transmissions of a packet, the receiver must know if the incoming packet is a retransmission and if so it must know which transmission it is. Two methods are proposed to solve this problem for the receiver.

The first method to enable the receiver to know if the incoming packet is retransmitted is to provide the information in the header. Note that the header is comprised of the OFDM symbol or symbols in between the preamble and the payload and carries information the receiver needs to process the payload of the packet. The information required in the header depends on the specific system. Here are two examples:

EXAMPLE 1

If the current packet contains retransmitted data or if it is original data (note that this can be expressed using a single bit)

The order the groups are transmitted (equivalently which cyclic shift is used). If the HARQ scheme divides the frequency tones into G groups, then at least log 2(G) bits are required in the header to communicate the order. For example, the original packet transmission would be 00, the $1^{st}$ packet transmission would be 01, the $2^{nd}$ packet transmission would be 10, and the $4^{th}$ packet transmission would be 11. By specifying the exact cyclic shift in the header, it is possible to start with any of the cyclic shifts for the original packet and continue in whatever order the transmitter desires for retransmissions.

EXAMPLE 2

The packet ID so the receiver can match the incoming packet to a previously transmitted packet for which it stored the LLRs.

The order the groups are transmitted.

The second method to enable the receiver to know the frequency tone mapping for the incoming packet is to have the transmitter only change the frequency tone mappings for retransmissions that are triggered by NACK messages from the receiver. A brief description of the ACK/NACK protocol is needed to understand this proposed method. FIGS. 8 and 9 is a flow diagram illustrative of the receiver processing. FIG. 8 is a flow chart illustrative of receiver PHY layer processing. The higher layer processing is illustrated in FIG. 9. The process begins 810. The packet is processed normally up to decoder 820. Before decoding the log-likelihood ratios LLRs, the receiver first checks to see if the packet contains information that is being retransmitted 830; this can be determined via examining the information in the header. If the information is being retransmitted, then LLRs from previous transmissions are loaded 835 and then the current transmission's log-likelihood ratios LLRs are combined with the log-likelihood ratios LLRs from previous transmissions 837, if they exist. The resulting LLRs are then passed directly to the decoder. An open memory is found 840 and the resulting LLRs are stored in memory 850 in case the packet is not decoded correctly. After the packet has been decoded 860, the packet is passed to the higher-layers for more processing 870. Soft combining of the retransmission with previously stored transmissions of that data packet, FIG. 9 is a flow diagram illustrative of higher layer processing. After processing the packet, it is determined if the packet was decoded correctly 920. If the packet is decoded correctly, the memory is released 925. The receiver sends a message to acknowledge the packet was received, this is the ACK message 927. On the other hand, if the packet was decoded incorrectly, then the receiver sends a message to tell the transmitter the packet was received in error so a retransmission is required, this is the NACK message 930. The packet is then forwarded for further processing 940 ending the method 950. It may also occur that the receiver doesn't even process the packet because it misses the packet altogether or doesn't process the header correctly.

Another component in a wireless packet is a cyclic redundancy code (CRC), which is used to ensure the integrity of the message. The receiver will compute the CRC based on the received information and check it against the received CRC bits. If the computed CRC matches the received CRC bits, it is determined the packet was decoded correctly. If the computed CRC does not match the received CRC bits, then the receiver determines that the packet has been decoded incorrectly. In this way, the CRC check can be used to determine whether an ACK or NACK should be transmitted.

FIG. 10 shows the proposed transmitter flow chart for this embodiment. The key aspect is that the transmitter only moves to the next frequency tone mapping if a NACK was received. If a retransmission occurs due to a time out then the frequency tone mapping is not changed (the value of i remains unchanged in the figure). In this embodiment, the receiver needs to keep a counter for how many times the packet has been retransmitted so that it knows the proper frequency tone mapping. The advantage of this embodiment is that it requires less information to be included in the header. In some embodiments, no information needs to be included in the header. However, in other embodiments the packet ID may be in the header. In FIG. 10, packet transmission is initiated and the counter i is set to 0 (step 1010). At 1020 the packet is transmitted in transmission i. Was a NACK received 1030? If a NACK was received counter i is incremented by 1 (step 1040) and the process returns to 1020. If however, a NACK was not received, it is determined if an ACK was received 1050. Packet transmission was successful 1060, if the ACK was received. If ACK was not received, a check if a predetermined wait time was exceeded is performed 1070. Process returns to 1020 if wait time was exceeded, 1030 if wait time was not exceeded.

It is possible that the PHY layer may be processing multiple packets (each with unique information) consecutively before it is able to send an ACK or NACK packet. This type of scenario occurs when the receiving device supports streaming or bursting of packets and block ACK scheme. When the PHY layer supports multiple packets, it must also support multiple HARQ processes, where each HARQ process is mapped to a different packet. Thus, each HARQ process would require its own dedicated memory. Each packet would store its LLRs in a different portion of memory and the LLR combining would occur only over packets that contain the same information. It is possible to statistically determine the optimal number of HARQ processes that provides the best trade-off in terms of complexity versus performance, but typically there should be enough memory to support two HARQ processes, or equivalently enough memory to store LLRs from at least two different and unique packets.

Modified Transmitter

In order to simplify the receiver and still allow for scrambling at the transmitter, it is proposed to swap the order of the scrambler and forward error correction blocks at the transmitter. FIG. 11 is a block diagram illustrative of a modified transmitter 1100. By swapping the order of these two blocks, it is possible to de-scramble the LLRs before the FEC decoder and allow for HARQ combining of LLRs, such as Chase combining (727 of FIG. 7). This type of scheme works best with a side-stream scrambler (such as linear feedback shift register) where the seed for the scrambler is transmitted in the header. Of course, it is possible to make this scheme work with self-synchronizing scramblers as well, but more effort is required in order to ensure that the scrambler is able to synchronize with the transmitter, since the SNR is lower before the FEC decoder than after. By modifying the transmitter so that the scrambler 120 comes before the FEC encoder 130 a conventional de-scrambler 320 can be used at the receiver. This modified transmitter has improved performance, in the same way the modified de-scrambler 620 improved performance when used with the conventional transmitter 100. The modified transmitter 1100 can use any type of FEC encoder—even non-linear codes.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. The term plurality may mean one or more.

What is claimed is:

1. A receiver for hybrid-automatic-repeat request (HARQ), comprising:
   a radio frequency (RF) front end;
   an analog-to-digital convertor (ADC);
   a synchronizer to remove cyclic prefix and for zero padding;
   a fast fourier transform (FFT);
   a frequency equalization (FEQ);
   a deinterleaver;
   a modified descrambler;
   a memory coupled to said descrambler;
   a combiner for combining transmissions; and
   a decoder coupled to and following said modified descrambler.

2. A method of retransmitting a packet after cyclically shifting a plurality of tones in a hybrid-automatic-repeat request (HARQ) scheme to create a plurality of frequency tone mappings, said method comprising:
   for a first retransmission, cyclically shifting data in a frequency-domain by one-half of a number of said plurality of tones;
   for a second retransmission, cyclically shifting data in the frequency-domain by one-quarter of a number said plurality of tones; and
   for a third retransmission, cyclically shifting data in the frequency-domain by three-quarters of a number of data tones from said plurality of tones.

3. The method of claim 2, wherein said plurality of tones are in four groups and hybrid-automatic-repeat request (HARQ) scheme defined as follows:
   original packet transmission:

$$Data_i^{(m)}(t) = \frac{1}{\sqrt{N}} \sum_{k=0}^{N_D-1} s_i^{(m)}(D_i^{(m)}(k)) \cdot \exp(j2\pi F \cdot D_0^{(m)}(k) \cdot t)$$

first packet retransmission:

$$D_1^{(m)}(k) = D_0^{(m)}\left(\left(k + \frac{1}{2}N_D\right) \bmod N_D\right)$$

second packet retransmission:

$$D_2^{(m)}(k) = D_0^{(m)}\left(\left(k + \frac{1}{4}N_D\right) \bmod N_D\right)$$

third packet retransmission:

$$D_3^{(m)}(k) = D_0^{(m)}\left(\left(k + \frac{3}{4}N_D\right) \bmod N_D\right).$$

4. The method of claim 2, wherein information comprising bits in header are used to communicate cyclic shift used on said plurality of tones.

5. The method of claim 3, wherein information comprising bits in header are used to communicate an order in which the four groups are transmitted.

6. The method of claim 2, wherein information comprising bits in header are used to communicate cyclic shift used on said plurality of tones.

7. The method of claim 3, wherein NACK messages from a receiver triggers changes in said frequency tone mappings for retransmissions.

* * * * *